US008489459B2

(12) United States Patent
Vallier et al.

(10) Patent No.: US 8,489,459 B2
(45) Date of Patent: Jul. 16, 2013

(54) DEMOGRAPHIC BASED CONTENT DELIVERY

(75) Inventors: William E. Vallier, Bridgewater, NJ (US); Steven V. Rimar, La Jolla, CA (US); Robert Lewis D'Avanzo, Jr., Skillman, NJ (US); Matthew J. Wylie, Basking Ridge, NJ (US)

(73) Assignee: Accenture Global Services GmbH, Schaffhausen (CH)

( * ) Notice: Subject to any disclaimer, the term of this patent is extended or adjusted under 35 U.S.C. 154(b) by 2156 days.

(21) Appl. No.: 11/513,408

(22) Filed: Aug. 31, 2006

(65) Prior Publication Data

US 2008/0059282 A1 Mar. 6, 2008

(51) Int. Cl.
*G06Q 30/00* (2012.01)

(52) U.S. Cl.
USPC ............................................. 705/14.66

(58) Field of Classification Search
USPC ............................................. 705/14.66
See application file for complete search history.

(56) References Cited

U.S. PATENT DOCUMENTS

| | | | |
|---|---|---|---|
| 2002/0174025 A1 | 11/2002 | Hind et al. | |
| 2003/0018522 A1* | 1/2003 | Denimarck et al. | 705/14 |
| 2006/0208070 A1* | 9/2006 | Kato et al. | 235/383 |
| 2008/0004950 A1* | 1/2008 | Huang et al. | 705/14 |
| 2008/0004951 A1* | 1/2008 | Huang et al. | 705/14 |
| 2008/0004953 A1* | 1/2008 | Ma et al. | 705/14 |
| 2012/0005013 A1* | 1/2012 | Ramer et al. | 705/14.46 |

FOREIGN PATENT DOCUMENTS

WO WO 02/17627 2/2002

* cited by examiner

*Primary Examiner* — James W Myhre
(74) *Attorney, Agent, or Firm* — Finnegan, Henderson, Farabow, Garrett & Dunner, LLP

(57) ABSTRACT

Disclosed herein are demographic based content delivery systems and associated methods that automatically and non-invasively detect information regarding one or more persons within a designated viewing area. In embodiments of the systems and methods, two different automatic viewer identification and demographic classification technologies may be utilized, either alone or on combination. The technologies include image recognition technologies that utilize computer driven image and pattern recognition analysis algorithms and radio frequency identification tagging and reading technologies. Data collected from either one of or both of the two technologies is used to feed a demographic classification algorithm which then delivers different multimedia content based upon the determination of the algorithm. The embodiments of the invention may therefore be advantageously utilized to market in real time to consumers at the point of sale.

23 Claims, 4 Drawing Sheets

| Demographic | 1st Video | 2nd Video | 3rd Video | 4th Video |
|---|---|---|---|---|
| $D_1$ | $V_1$ | $V_2$ | $V_3$ | $V_4$ |
| $D_2$ | $V_5$ | $V_3$ | $V_1$ | $V_7$ |
| $D_3$ | $V_2$ | $V_1$ | $V_8$ | $V_3$ |
| $D_4$ | $V_4$ | $V_7$ | $V_3$ | $V_8$ |
| $D_5$ | $V_6$ | $V_3$ | $V_1$ | $V_5$ |
| $D_6$ | $V_6$ | $V_1$ | $V_4$ | $V_2$ |
| $D_G$ | $V_G$ | $V_1$ | $V_5$ | $V_2$ |

FIG. 4

DEMOGRAPHIC BASED CONTENT DELIVERY

FIELD OF THE INVENTION

The present invention relates to systems and methods for delivering advertising, entertainment, or other audio or video content to persons based upon automatically detected demographic data describing the persons. More particularly, the present invention relates to context based architectures that may be utilized in order to deliver different advertising content to different persons based upon electronically detected demographic data of the persons.

BACKGROUND OF THE INVENTION

Despite the diffusion of constantly advancing technologies into every day life, traditional mass marketing techniques still remain as the most popular way to market to consumers. In particular, traditional repetitive TV and radio advertising campaigns and print advertisement campaigns dominate the focus of most large scale advertising campaigns. Such traditional advertising mechanisms are essentially broadcast messages—they target very wide audiences of potential consumers.

Such traditional advertising mechanisms attempt to maximize the positive impact of the advertising effort by communicating their advertising message to parties that they think will be most interested in the respective product or service. Expert demographic research analysts constantly study what products and services are purchased by what types of people, and by what messaging approaches and communication mechanisms such different types of people can be best reached. In deciding, for example, on what television stations and which time slots to air certain advertisements, such demographic analysts will identify target demographic groups for the product, and then select commercial messaging and schedule time slots on various television stations to best reach those target demographic groups. Traditional print advertisements work in much the same way, with advertisers choosing publications and placements within publications with the goal of having the advertisement be seen by a high proportion of persons likely to be interested in the product or swayable by the advertising message.

When trying to gain insight to consumer needs and desires across various demographics, demographic research analysts are hampered by having only a few data sources that provide limited and often conflicting data. Conventionally, consumer preferences could only be derived indirectly through inferential demographic studies based upon the success of certain past promotional efforts, or directly through limited-reach questionnaires or focus groups. Advertisers are constantly seeking ways to communicate with consumers, and target demographic groups of potential buyers in particular, with advertisements that are tailored to their needs, desires, and lifestyles. Nonetheless, the advertising mechanisms and demographic information gathering techniques presently employed fall far short of ideal for a variety of reasons.

While the exposure to potential consumers is fairly large with traditional television, radio, and print advertisements, this exposure lasts only for a short period of time. Most problematic is that the exposure to such advertisements more often than not occurs at a time when the consumer is least ready to purchase (e.g., at home watching TV). Thus, even if the advertisement does reach a targeted consumer demographic, and even if one or more consumers are enticed to purchase the product or service or shop at the store advertised, those enticed consumers must still remember to follow up on the offer at a later, more convenient time on their own.

Thus, retail stores are constantly searching for better ways to reach and influence consumers with traditional promotional mechanisms. A recent attempt by large retail chains directed at building brand loyalty in consumers includes the innovation of consumer loyalty club programs. Such loyalty programs entice consumers to join by offering rewards, such as coupons, cash back rewards, or eligibility for special promotional offers, that are offered only to consumers that participate in the loyalty program. A consumer joins such a program by typically providing the retailer (either at a retail location during checkout, or during check out at the retailer's website) sign-up information including their identity, interests, address, email address, and the like. Sometimes, a nominal membership fee is also required to join or renew membership on a periodic (e.g., yearly) basis. To qualify for their loyalty rewards, the participating consumer must present their loyalty club card or provide some sort of other identification each time they make a purchase from the retailer. After a certain number of purchases or a certain dollar amount of cumulative purchases is met by participating consumer, they will qualify to redeem certain rewards.

Retailers benefit from consumer loyalty programs in two manners. First, participating consumers are given an incentive to always make purchases from the same retailer or retail chain as opposed to competitors. Secondly, retailers are able to collect fairly targeted information regarding participating consumers' purchasing histories. For example, over time a retailer may notice that a certain consumer participating in their consumer loyalty program frequently buys CDs for a particular style of music. As the number of participating consumers in a loyalty program grows, the retailer is able to develop demographic data concerning its own actual consumers. This reduces their sole reliance upon more generic demographic data compiled by the researching efforts of professional advertising and demographic analysts. Since the retailer has this information as well as the participating consumer's home and email addresses, the retailer may be able to send targeted advertisements directly to certain consumer participating in the loyalty club program (such as by promotional inserts included with mailings of consumer rewards certificates) with a strong likelihood that such targeted advertisements are reaching certain desired demographic groups. In this manner, the above-described user could be provided with lists of newly released CDs of the particular music type that the user likes, or coupons providing percentage discounts on volume CD purchases. Additionally, such information may also be used to entice consumers regarding products and other related areas. Over time, retailers can monitor whether, for example, those specific customers that have a demonstrated history of purchasing CDs on a regular basis may also demonstrate receptiveness to advertisements regarding other music and audio entertainment items, such as portable digital audio players, home theatre speakers, and the like.

While they comprise a significant advance in the area of consumer demographic research and advertisement targeting, current advertising mechanisms that leverage demographic information from customer loyalty programs still fail to capitalize fully upon the potential to provide targeted advertising where it would be most useful—in situations where the consumer is ready for an immediate purchase. In particular, it would be desirable if mechanisms were available that enabled retailers and other advertisers to provide demographically targeted advertisements to consumers within a retail store environment. Thus, the effectiveness of advertising investments would be greatly improved that the advertisements were not only reaching the right demographic audience, but also reaching them at or near the time when they are most likely to make a purchase in order to maximize the ability to influence the purchasing decision. While traditional print and electronic mailings generated in conjunction with current loyalty programs may be targeted to consumers based upon demographic and purchase history information of loyalty program participants compiled over time, such mailings nonetheless reach the consumer (if at all) when the consumer is not necessarily interested in or thinking about making a purchase. If and when the consumer eventually decides to make a purchase, the targeted mailing could be long forgotten or even lost.

Traditionally, retailers relied upon the skills of experienced sales staff to identify customers within their stores and market products at the point of sale. A skilled and experienced salesperson would be able to read a customer demographically, for example, by directly observing their age, sex, marital status and the like, and then use those observations in efforts to market products to the customer. Many conventional large retail chains, however, have diverted away from the salesperson driven approach used in the past. Large retail chains rely predominantly upon large volume sales and diverse inventory in order to curb costs and thus pass lower prices on to the consumer. As skilled sales staff has been phased out of usage, a primary mechanism for marketing to targeted demographics of consumers at the point of sale has been lost.

Thus, there remains a need in the art for improved systems and methods for achieving demographically targeted advertising at the point of sale. It would be advantageous if such systems and associated methods were capable of automatically identifying consumers demographically within a retail store environment and, in response, automatically providing those consumers with demographically targeted advertising at the point of sale.

SUMMARY OF THE INVENTION

In light of the above needs, it is an object of the present invention to provide methods and systems for facilitating targeting of marketing efforts to consumers of various demographics groups at the point of sale.

Additionally, it is an object of the present invention to provide systems and methods that automatically accumulate demographic information from consumers and communicates different promotional material to consumers depending upon how they sort into various demographic classifications.

Furthermore, it is an object of the present invention to provide systems and associated methods for demographic based content delivery that utilizes various electronic means for automatically detecting and classifying viewers into various demographic classifications.

To achieve these and other objects, the present invention comprises a demographic based content delivery system and associated methods that automatically and non-invasively detect information regarding one or more persons within a designated viewing area. In certain embodiments of the present invention, two different automatic viewer identification and demographic classification technologies may be utilized, either alone or on combination. They include image recognition technologies that utilize computer driven image and pattern recognition analysis algorithms and radio frequency identification tagging and reading technologies. Data collected from either or both of the two technologies is used to feed a demographic classification algorithm which then delivers different multimedia content based upon the determination of the algorithm.

In certain embodiments of the present invention, a retailer may use systems and methods of the present invention in conjunction with a customer loyalty program. In such embodiments, consumers that are members of the loyalty program are given customer loyalty cards that include radio frequency identification microchips that may be monitored by an RFID detection system of the demographic based content delivery system. Whenever a participating consumer visits a store location of the retailer (whether or not the participating consumer makes a purchase) the participating consumer will typically carry his or her loyalty card on his or her person so as to qualify for "points" toward loyalty rewards. In this regard, the RFID detection system can detect the RFID tagged customer loyalty cards and determine an appropriate demographic classification to identify the desired content to be displayed to the viewer.

In other embodiments of the invention suitable for use by retailers, it is also possible for demographic classifications to be determined for consumers that are not participating as members of the retailer's customer loyalty program. For this purpose, the systems and methods of the present invention may utilize facial recognition systems to demographically classify consumers situated within a monitored area.

In the various embodiments of the present invention, the systems and associated methods detect demographic data for persons and classify them into one or more demographic classifications which are then utilized to drive product sales promotions at or near a time of potential purchasing activity, such as while a given consumer is shopping in a store location of a participating retail chain. In such preferred embodiments of the present invention, a participating consumer can be identified when they enter a designated viewing area by their RFID tagged consumer loyalty card. The demographic based content delivery system could then initiate a request for the demographic data or a demographic classification for the consumer. The demographic classification system would then review the demographic information, based upon collected purchasing history information concerning the participating consumer, and then cause appropriate multimedia content to be delivered that is reflective of the pre-established promotional desires of the retailer/advertisers.

It should be readily appreciated by one skilled in the art that embodiments of the present invention can be utilized not only in conjunction with retailers and advertisements/promotions, but for various other situations where it would be desirable to automatically deliver content based upon automatically detected demographic classifications.

In this regard, a first aspect of the present invention includes an electronic system for selectively delivering multimedia content to persons based upon automatically detected demographic data relating to one or more of the persons. The electronic system comprises an output delivery means for delivering multimedia content to the persons, and delivery control means adapted to send control signals to the output delivery means to vary multimedia content delivered. The delivery control means includes a database containing digital content files and an application for selecting and delivering the digital content files to the output delivery means via the control signals. The electronic system also comprises a demographic classification means for detecting the persons and assigning demographic classifications thereto. The demographic classifications are assigned by a demographics classification algorithm according to predefined classification rules. The demographic classification means sends demographic signals to the delivery control means representing the assigned demographic classifications. The application selects certain appropriate content files based upon the received demographic signals and stored data correlating the content files to predefined demographic classifications.

Further, a second aspect of the present invention relates to a demographic based content delivery process for selectively delivering multimedia content to persons based upon automatically detected demographic data relating to one or more of the persons. The process comprises storing digital multimedia content files in an electronic database, and associating one or more demographic assignments with each of the content files. The process further comprises defining demographic classification rules for usage by a computer operated demographic classification algorithm. The rules control prioritization determinations made by the algorithm upon inputted demographic data. The process additionally includes detecting viewer identification data electronically and automatically concerning one or more of the persons within a defined viewing area, and determining with the algorithm a priority demographic classification for the persons within the defined viewing area according to the rules and the detected viewer identification data. Furthermore, the process comprises identifying one or more content files associated with the priority demographic classification, and delivering the identified one or more content files.

Additionally, a third aspect of the invention includes a content delivery process for selectively delivering multimedia content to persons using an automated demographic detecting content delivery system. The process comprises establishing a demographic based content delivery system. The established system has output delivery means for delivering multimedia content to the persons, delivery control means adapted to send control signals to the output delivery means to vary multimedia content delivered, and demographic classification means for detecting the persons and assigning demographic classifications thereto. The process further includes storing digital multimedia content files in an electronic database of the delivery control means, and associating in the delivery control means one or more demographic assignments with each of the content files. Additionally, the process comprises defining demographic classification rules for usage by a computer operated demographic classification algorithm of the demographic classification means. The rules controlling prioritization determinations are made by the algorithm upon detected identification data. The process also comprises the demographic classification means detecting viewer identification data electronically and automatically concerning one or more of the persons within a defined viewing area, and determining with the algorithm a priority demographic classification for the persons within the defined viewing area according to the rules and the detected viewer identification data. Furthermore, the process includes the delivery control means receiving the priority demographic classification and identifying one or more content files associated with the priority demographic classification, and controlling the output means to deliver the identified one or more content files.

The various embodiments of the invention having thus been generally described, several illustrative embodiments will hereafter be discussed with particular reference to several attached drawings.

BRIEF DESCRIPTION OF THE DRAWINGS

FIG. 4 is an illustration of an example demographic-to-video file correlation table utilized by demographic based content delivery systems in accord with certain embodiments of the invention.

DETAILED DESCRIPTION OF THE PREFERRED EMBODIMENTS

Figure 1:
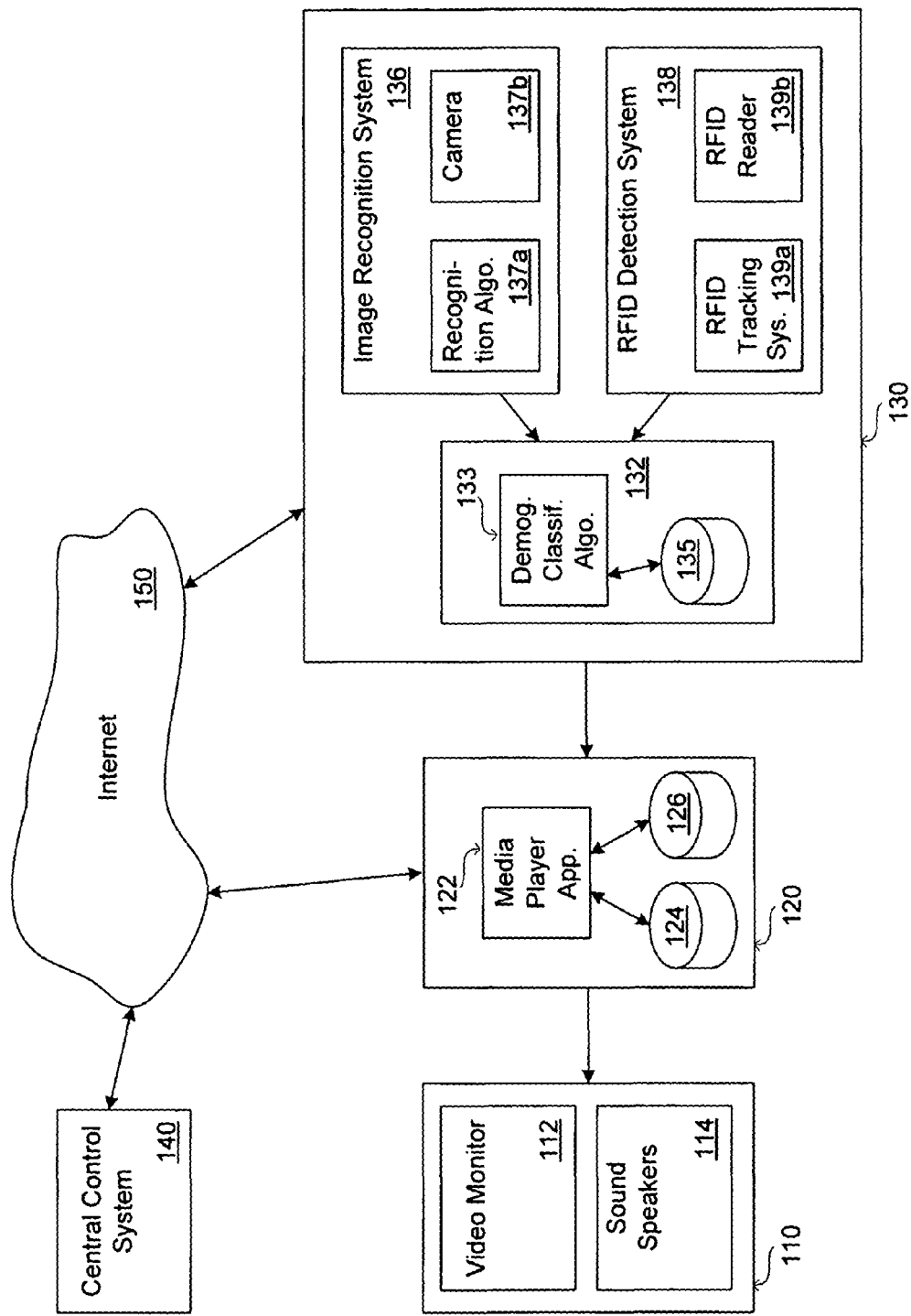
FIG. 1 is a schematic diagram showing a demographic based content delivery system according to an embodiment of the present invention.

FIG. 1 is a schematic diagram showing a demographic based content delivery ("DBCD") system 100 according to one preferred embodiment of the present invention. The demographic based content delivery system 100 according to the present invention can understandably be used advantageously, among other places and uses, in retail store environments (and electronics retail stores in particular) to differentiate and provide increased brand exposure for certain products or producers and manufacturers as desired. For example, media content files delivered by the DBCD system 100 can include videos of various lengths that display clips from recently released or upcoming releases of DVDs or movies in theaters, describe the features of a television or sound system, describe the features of associated audio/visual equipment (DVD players, high definition video satellite set top boxes, sound systems, etc.), describe the features of satellite TV services (channels, sports packages, high definition signals, etc.), or otherwise provide sales or promotional messages relating to the retailer or other affiliated advertisers. In this regard, the DBCD system 100 may be used to demographically target and may drive product sales promotions at or near the point-of-sale, such as while a given consumer is shopping in a store location of a retailer.

As shown in the drawing, DBCD system 100 utilizes an output delivery system 110 to deliver media content to viewers as directed by signals received from an electronic delivery control system 120. Typically, output delivery system 110 will include both means for displaying video content, such as a video monitor 112, and means for playing audio content, such as sound speakers 114, which means operate in coordination to display integrated audio/visual media to viewers. Typically, in preferred embodiments of the present invention the output delivery system 110 will include a television set. Understandably, such a television set can be located, for example, in a large television display area of a retailer that sells consumer electronics equipment. Optionally, output delivery system 110 can include a large screen (e.g., high definition) television monitor and associated home theater surround sound system as commonly utilized in such retail display situations.

While not specifically depicted in FIG. 1, it should be understood that DBCD system 110 can include multiple video monitors 112 such that, for example, delivery control system 120 sends signals to multiple televisions, causing each television to display the same media content (or portions thereof) simultaneously.

Delivery control system 120 includes computing means, such as a computer having an electronic data processor, associated memory and operating software, and electronic storage. The computing means optimally includes a personal computer having a high speed microprocessor, a large capacity hard disk or other persistent electronic storage, suitable memory, and a video card or other video controller capable of sending appropriately formatted audio and/or video signals to the output delivery system 110 such that the computing means is able to support the efficient operation of a suitable digital media playing application 122. For example, where the output delivery system 110 comprises a large screen high definition television coupled with a home theater receiver and surround speaker system, the delivery control system could be a PC coupled with a high definition video card capable of emitting analog or digital video signals via composite, s-video, component video, HDMI, DVI, or other suitable standard or high definition video cabling and a sound card capable of emitting a suitable sound signals, such as an analog sound signal or a digital signal via coaxial, optical, or HDMI cabling.

Delivery control system 120 as depicted also includes two databases residing in its electronic storage. The first is a content database 124 containing digital audio/video content files that are intended to be delivered (i.e., played) to various different detected and demographically classified audience members (also hereafter referred to as "viewers"). Each of the digital content files are classified into various different demographic groups via a demographic correlation database 126. This database 126 includes data correlating which content files are to be delivered to which demographic classes of viewers. As is known in the art of computer architecture design, both databases 124 and 126 can of course be managed by a large relational database application or other suitable known mechanisms, such as a standard file folder system for the digital content files and a flat file for the demographic correlation data. One such suitable flat file for correlating content files to particular demographic classifications will be described further below with respect to FIG. 4.

The delivery control system 120 according to preferred embodiments of the present invention includes a media playing application 122 capable of playing the various media files via the output system 110 in accord with stored rules that dictate when and how certain ones of the media files should be delivered.

The delivery control system 120 is electronically connected to a demographic classification system 130 and is adapted to receive regularly from the demographic classification system 130 a signal representative of one or more viewers automatically detected in a viewing/listening area associated with the output delivery system 110. This signal includes at least an identification of one priority demographic classification associated with the one or more viewers. Demographic classifications suitable for use in various embodiments of the present invention can include, for example, gender, age, income range and ethnicity. Understandably, the demographic classification signal sent by system 130 could specify multiple demographic classifications such as, for example, the three-part classification "over 30 white male." Alternatively, the signal could describe more simple classifications, such as "adult female," "pre-adult male," or even more simply, "female/male" or "child/adult." Thus, it should be understood that various different levels of demographic classification ca be used by both the system 120 and system 130 depending upon the design and purpose of the particular DBCD system 100. Further, it should also be understood that various different mechanisms could be employed to detect the appropriate demographic classifications for given viewers so long as demographic classification system 130 is configured to receive and interpret outputs from said classification mechanisms in order to provide a signal to delivery control system 120 that is recognizable by the delivery control system 120 as identifying a priority demographic classification from a group of predefined possible demographic classifications.

As shown in FIG. 1, preferred embodiments of the present invention can utilize, alone or in combination, one of two different automatic viewer identification and demographic classification technologies, namely image recognition technologies that utilize computer driven image and pattern recognition analysis algorithms (such as are utilized in common computerized facial recognition systems) and radio frequency identification ("RFID") tagging and reading technologies. Both such technologies are non-intrusive automated methods of identifying and demographically classifying viewers. In this regard, while only one such technology is required for embodiments of the invention, preferred embodiments of the demographic classification system 130 utilize both an image recognition system 136 and a RFID detection system 138 to collect information for making a demographic determination for use by the delivery control system 120. Information from each of these collection systems 136 and 138 is electronically communicated to a central computing means 132 of demographic classification system 130, such as a personal computer or the like, that is adapted to utilize an appropriate algorithm 133 to make demographic classification decisions in light of the collected demographic information and instruct the delivery control system 120 as appropriate. Each of the demographic classification technologies will now each be described in further detail for purposes of illustration.

Computerized image and pattern recognition, and facial recognition in particular, has gained popularity in recent years as a promising technology for security and surveillance applications. This technology is attractive because it is passive in that it does not stop activities of the subject being analyzed. Different alternative technologies that utilize image and pattern recognition concepts can vary from relatively more simple applications like the static matching of controlled format photographs to more complex real-time applications like the matching of live video image sequences. Understandably, embodiments of the present invention will require systems that are robust enough to operate outside of controlled format static matching situations in order to be a truly non-intrusive, real time mechanism for demographically classifying viewers.

Traditional face recognition addresses the problem of identifying or verifying one or more persons of interest in digital image scene (whether captured by static photographs or video) by comparing input faces with face images stored in a database. The general procedure used by most face recognition systems includes detection of faces within the captured/input scene image, extraction of certain defined facial features from the detected faces, and then utilizing a matching algorithm to compare the features of the detected faces against features contained in a database of facial photographs.

Traditional facial recognition applications, however, are meant to authenticate and/or verify the identity of known persons, not to classify unknown persons generally into one or more relevant demographic classifications. Demographic classification technology that uses facial recognition concepts, however, has been introduced that is adapted for classifying persons according to various demographic classifications based upon appearance, such as age, gender, and ethnicity. For example, Mitsubishi Electronic Research Laboratories has developed working systems that can record the arrival of people and divide them into demographic classes. The system monitors electronic video feeds, detects faces, tracks them across time, and classifies them in various demographic areas (e.g., by gender and ethnicity). That system works online and in real time according to an algorithm that is capable of analyzing video at 15 frames per second.

Such demographic classification systems work by comparing captured facial images of subjects with a large database of demographically classified facial files. The demographic facial files database, for example, would include multiple facial files for each of the demographic classifications that the particular demographic system is designed to handle. In this manner, such a system designed to classify by gender (male/female) and two age groups (under 20/over 20) would require a less extensive facial files database than one that classified by gender and four age groups (under 10/between 10 and 20/between 20 and 35/over 35). Likewise, the extensiveness of the database would be proportional to the number of demographic class areas (e.g., gender, age, ethnicity) utilized.

In this regard, demographic classification system 130 includes an image recognition system 136, which system is an electronic apparatus that incorporates an image processing algorithm 137a running on a suitable computing device and adapted to process images obtained from one or more input cameras 137b. The image processing algorithm 137 is adapted review the images and provide demographic classifications for each of the identified persons. Importantly, facial recognition and related demographic classification algorithms adapted to operate on real time data generally utilize closed circuit video feeds as a primary input. Understandably, the quality of the image obtained via the video feed directly impacts the quality of the analysis that can be provided. Poor image resolution, lighting/shadows, obscured subjects, or turned faces (e.g., too far rotated off of center) can greatly degrade the ability of the algorithm 137a to operate accurately. Thus, it is preferred in embodiments of the present invention that multiple cameras 137b be utilized for each viewing area monitored by the image recognition system 136 in order to capture images of viewers from a variety of perspectives. Such increases the likelihood that an acceptable image will be captured relatively quickly for each viewer in the viewing area. Additionally, it is also preferred that such cameras 137b are digital video cameras capable of capturing and electronically transmitting a relatively high resolution image. Optionally, the cameras can include both traditional video cameras and thermal infrared cameras adapted to sense temperature variations in the face at a distance, and produce thermograms in the form of two dimensional images. Such thermal infrared cameras are commonly used in many face and image recognition systems to augment visible images in order to counterbalance the effects of shadows and variable lighting.

The specific signal output by the particular image recognition system 136 utilized can, of course, vary with the caveat that it will indicate at least one of the following: at least one demographic classification (e.g., gender, age group, etc.) for at least one viewer, or an indication that no demographic classification is available (e.g., no viewer detected, or no classification can be determined by the algorithm). In this manner, if the image recognition system could identify a viewer and determine that the viewer is a female of the 20-35 age group, but could not determine ethnicity with sufficient certainty, then the signal output could indicate a detection of one viewer that has the following demographic classifications:

Gender: female
   Age: 20-35
   Ethnicity:unknown (e.g., "NA" or left empty)

Likewise, it should be understood that the signal output will of course vary depending upon how many demographic areas into which the algorithm 137a will attempt to classify each viewer. For an image recognition system 136 adapted to identify viewers only by gender, for example, the signal will of course be silent with respect to how a given viewer could be classified into other demographic areas.

In situations where two or more viewers are detected in the viewing area, the output signal of the image recognition system 136 could communicate the classification information derived for each of the viewers in a single composite signal.

In preferred embodiments of the present invention, the image recognition system not only outputs a signal containing classification information for one or more detected viewers, but also provides a degree of certainty associated with each determined classification. For example, the signal, for each defined demographic area, could dictate a determined classification and associate with each such determined classification a measure of certainty regarding that classification. For example, a number between 0-100 (e.g., representing the percentage of accuracy expected for the particular demographic classification determination) could be provided for each determined classification with the magnitude being understood as a measure of belief or certainty in that classification decision made by the algorithm. This certainty, for example, could reflect multiple image captures for a given viewer and determining running averages or other composite scores for each demographic area for the viewer over a short period of time. In this regard, the output signal could provide best guesses as to what a demographic classification a particular user falls for a defined demographic area and leave it up to the algorithm employed by the demographic classification system 130 to determine if that classification is sufficiently certain to be reliable and used for controlling content delivery. In this regard, the demographic classification system could be configured to disregard demographic classifications with reported certainty scores below a predefined minimum. This capability could, for example, allow those configuring the DBCD system 100 to make judgments that they would rather deliver gender neutral content to viewers in situations where gender couldn't be determined with greater than 50% accuracy.

The second demographic classification technology which may be utilized to identify potential viewers in embodiments of the present invention utilizes RFID tracking devices to identify consumers carrying RFID tagged customer loyalty cards. Recent technology has been introduced that utilizes RFID-tracking means to monitor the activity of participating consumers within a retail location via the tracked movements of an RFID tagged customer loyalty card. This technology, for example, can be used to supplement the normal information collected by retailers using customer loyalty programs, namely purchasing history information, by also enabling the cataloging of the aisles visited, the departments browsed, and the time in a retail store whenever such a participating consumer visits any monitored retail location. This in-store consumer activity may then be communicated back to a central network for storage in a consumer information database. Typically, store browsing information captured from the use of such RFID tagged customer loyalty cards is uploaded on a periodic, real time or other suitable basis to a central network for storage in a centralized consumer information database. In this regard, the RFID technology allows retailers to augment the consumer data collection aspects of tradition customer loyalty programs that normally only collected participating consumer information from purchases in various stores and on the web. This consumer information collected over time can be reviewed, researched, and ultimately used to perform demographic studies and craft targeted promotions to customers on both an individual and a demographic class basis.

Demographic classification system 130 thus could utilize like RFID detection technology by including a RFID detection system 138 adapted to monitor consumer browsing activity within the store of the retailer. Such an RFID tracking system 138 is adapted to interact with RFID-tagged customer loyalty cards carried by participating consumers when they visit retail store locations. The RFID tracking system 138 comprises a group of RFID reader sensors 139*b* located at various positions with a store networked with a computing device 139*a* for tracking RFID readings of those sensors. In particular, according to embodiments of the present invention, system 138 enables each consumer carrying an RFID-tagged customer loyalty card to be detected and identified automatically when entering the monitored display area(s) for output system 110. This loyalty card RFID is then compared to a database (local or centralized remotely) that provides demographic data on the subject consumer. Such demographic data with respect to the RFID detection system 138 can be data obtained directly (e.g., from the customer's answers on the initial form to join the loyalty club), or inferred from records of previous purchasing and browsing activity of the customer.

As shown in FIG. 1, the delivery control system 120 and demographic classification system 130 optionally may be connected to a central control system 140, such as with a high speed connection over the Internet 150. A high speed connection is preferable as it allows real time access to centralized loyalty program participant history and recorded/inferred demographic information contained in the various databases of the central control system 140 and will enable immediate access to information concerning consumers detected by their RFID card. In such embodiments a central rules and configuration database in a central control system 140 would contain administrative information specific to the account of each participating consumer (e.g., a consumer that has opted to joining the customer loyalty program of the retailer). This information could include information relating to the identity of the participating consumer, his or her email and postal addresses, and loyalty card ID and RFID. This administrative information for each participating consumer would be linked to purchasing and browsing history information stored elsewhere in databases of system 140 so that demographic classification assignments can be made for each person.

Furthermore, such a design utilizing access to a remote central network enables potential remote control and/or updating of the databases and files stored in systems 120 and 130. In this regard, the various computing devices of the DBCD system 100 could be connected over the Internet (or other electronic communications means) to the central control system 140 to permit the retailer to centrally manage the DBCD systems installed at a variety of remote locations. The computing devices of the DBCD system could be adapted to download updated data regarding consumer information, new digital multimedia content files, new demographic classifications or rules (stored in algorithm rules database 135 of demographic classification system 130, which rules are described further below), and the like from databases of the central control system 140 as necessary (such as nightly, weekly, in real time, or otherwise as needed). Likewise, the inclusion of a connection to the central control system 130 allows DBCD system 100 to transmit usage data back to central location for review and monitoring. In this regard, administrators could review demographic information concerning customers that enter the viewing area and review the extent of public exposure given to the various content files.

Alternatively, it is of course possible to utilize DBCD system 100 without integration with a central control system 140. In such embodiments, each personal computer or other computing device used to implement systems 120 and 130 would of course have local user interfaces that permit administrators to update the contents and configurations of each database and file as described herein as is known in the art.

Figure 2:
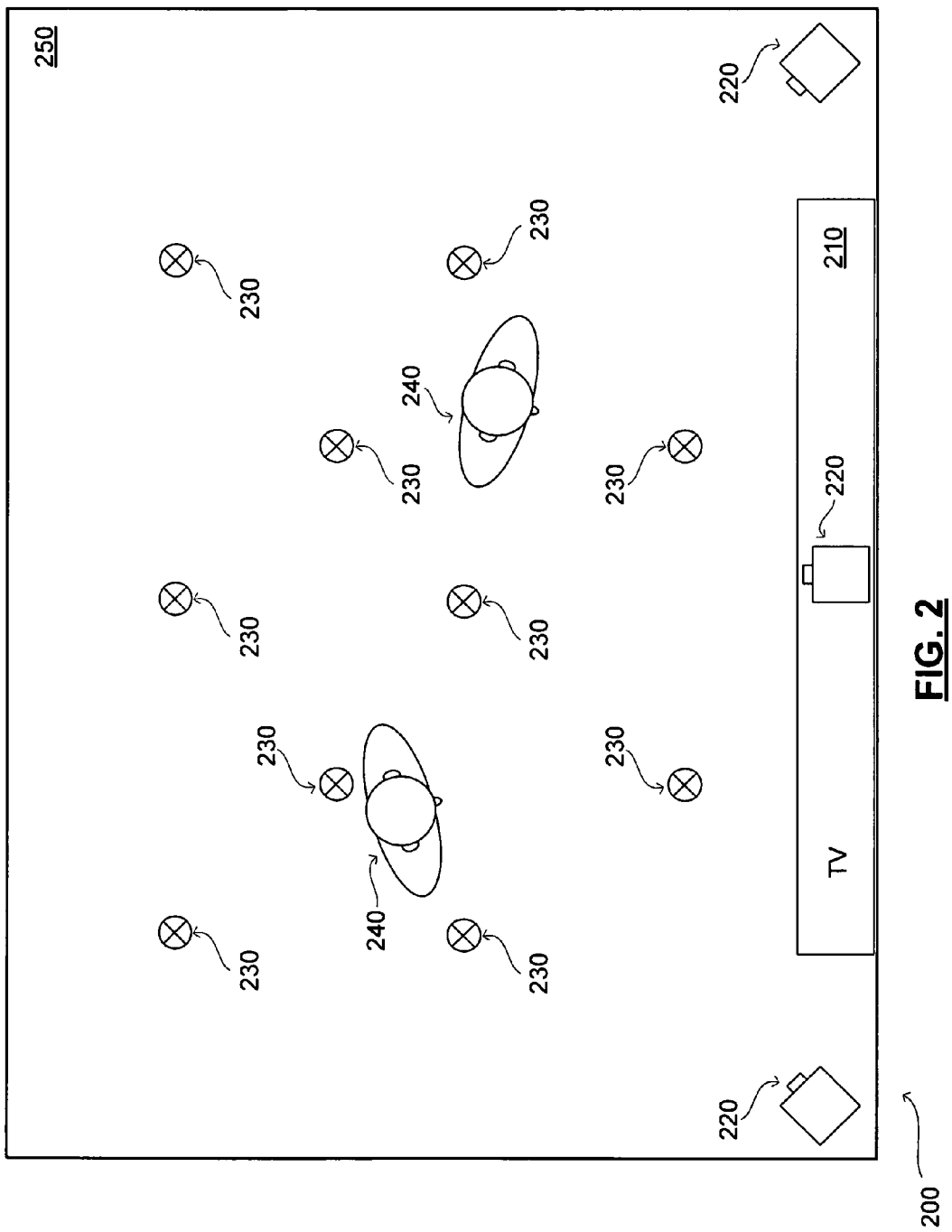
FIG. 2 is schematic diagram of a layout plan for arranging parts of a demographic based content delivery system within a display area of a retail store location in accordance with certain embodiments of the present invention.

FIG. 2 is schematic diagram of a layout plan for arranging parts of a demographic based content delivery system, such as DBCD system 100 of FIG. 1, within a display area of a retail store location in accordance with certain embodiments of the present invention. Display area layout plan 200 shows the relative locations and physical interaction of various elements in a monitored display area 250, including a plurality of RFID reader sensors 230 located at various positions as depicted. Typically, sensors 230 would be arranged in a grid as shown to provide a high probability that any given participating consumer 240 carrying an RFID-enabled customer loyalty card for the participating retailer will be detected and identified by the RFID detection system of the demographic classification system soon after entering the area 250. This identifying enables immediate triggering of possible demographically targeted video playback to each such participating consumer on television 210. The RFID sensors 230 are in electronic communication (wired or wirelessly) with a control terminal (not depicted in FIG. 2) which serves as an interface mechanism with the classification system. For example, this terminal may comprise a networked personal computer that also serves the function of computing device 132 depicted and described above with respect to FIG. 1, and the terminal is preferably connected to the Internet with a high speed connection to permit real time uploading and downloading of information from a central control system.

The RFID sensors preferably are physically distributed throughout plan 200 so as to maximize coverage area. Understandably, as noted above, similar RFID sensors may also be used elsewhere in the store outside of area 250 additionally in order to identify where in the store a particular participating consumer (carrying his or her RFID-enabled loyalty club card) browses and/or spends time during a given visit. Thus, for example, if a given participating consumer spends significant time in the laptop computer display area of the store, this would be detected by certain RFID sensors and tracked for reporting to a central control system for later use as advertising insight information.

RFID sensors 230 are typically small and unobtrusive. The could, for example, be mounted within the floor, walls, furniture, or ceiling of the display area 250 so as to not be noticeable by customers 240.

At the front of display area 250 is a large screen television 210 that is connected to the output control system, which system typically will be concealed away from view by customers 240 (and thus is not depicted in this drawing). Towards the front of the display area, several digital video cameras 220, which provide inputs to the image recognition system (also not shown in this drawing), are arranged at several locations (e.g., on either side of and on top of the television 210) in order to obtain a variety of image perspectives for use by the image recognition algorithm. As shown in FIG. 2, customers 240 can be detected automatically by either technology as they view content on television 210 without impeding their activities or requiring direct interaction on their part.

Figure 3:
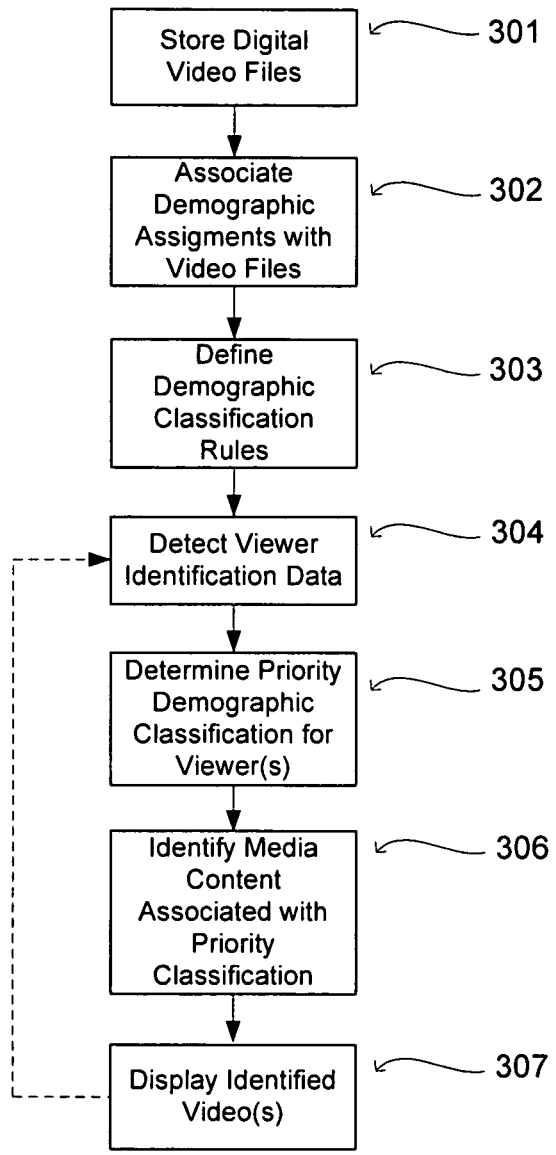
FIG. 3 is a flow diagram showing a demographic based content delivery process enabled by systems according to embodiments of the present invention to present promotional multi-media content to in-store consumers.

Turning now to FIG. 3, there is depicted a flow diagram of a demographic based content delivery process 300 that presents promotions to in-store consumers by utilizing demographic based content delivery systems according to embodiments of the present invention. Process 300 as depicted is intended to assist one of ordinary skill in the art in understanding the interrelation of various steps in accordance with certain aspects of the present invention. It will be appreciated by those of ordinary skill in the art that unless otherwise indicated herein, the particular sequence of steps described is generally illustrative only and, where apparent, can be varied without departing from the spirit of the invention. Thus, the steps can be performed in any convenient or desirable order. Further, while not explicitly depicted, it will be understood by one skilled in the art that various ones of the steps below are meant to be repeated regularly in order to maintain current data.

In preferred implementations, demographic based content delivery process 300 is used to present promotional multimedia content, specifically, video files, to in-store consumers of a retailer. As depicted in the flow diagram, process 300 can be thought of as having a set up phase consisting mainly of steps 301-303, and an information gathering and execution phase consisting mainly of steps 304-307. The set up phase comprises the various preparation steps taken to establish a working system, and starts at step 301 with the storing of various digital multimedia content files, such as video files, in the content database of the delivery control system.

At step 302, the set up phase continues with an administrator associating demographic classification assignments with each content file. As will be explained further below, it will of course be possible for certain content files to be appropriate for more than one demographic grouping. For example, those video files that are particularly suitable for teen aged women specifically, may also be classified as being suitable for women generally or teens generally. This aspect of the invention will be described further below with respect to FIG. 4.

Finally, at step 303, the set up phase concludes with the defining demographic classification rules for use by the demographic classification algorithm of the demographic classification system.

Once the system is set up, the participating retailer can begin to utilize the system by at step 304 detecting viewer identification data. In the manner as generally described above, at step 304 the DBCD system utilizes its various automated information gathering technologies to detect viewer identification data. As illustrated above with respect to FIG. 1 and FIG. 2, this detection can be performed by an image recognition system using strategically placed video cameras around the output delivery system (e.g., television) or using various RFID sensors of the RFID detection system adapted to detect a RFID-tagged customer loyalty card being carried by a viewer.

Process 300 continues at step 305 where the demographic classification system uses the collected viewer identification data to determine a priority demographic classification for the viewer(s) (i.e., an optimal, best, final, or primary classification). In the manner generally described above, this step entails the image recognition system (if used) taking the collected image information and comparing it against its database of demographically cataloged facial images and producing a signal that is communicated to the computing device that is running the demographic classification algorithm, which signal contains information reporting the demographic classification(s) into which each detected viewer falls. Similarly, the step also includes the RFID detection system (if used) taking the detected RFID tag(s) and transmitting it to the processor running the demographic classification algorithm.

Step 305 continues with the demographic classification algorithm by using the demographic information obtained from each utilized detection technology and determining therefrom a priority demographic classification for which associated media content should be delivered by the output delivery system. This portion of step 305, of course, is performed by the demographic classification algorithm in various different ways depending upon what types of demographic classification technologies are being utilized. With respect to RFID detection technology coupled with RFID tagged customer loyalty cards, the algorithm associates any detected RFID tags with consumers that are participating in the customer loyalty program. To achieve this end, the demographic classification algorithm could, for example, consult a local database that associates demographic classification(s) with each customer (or RFID tag) participating in the customer loyalty program, or alternatively cause the demographic classification system to contact a remote customer information database located in a central control system over the Internet. With respect to the image recognition system, the demographic classification algorithm would receive the signal and analyze each viewer and demographic classification(s) determined for each.

If more than one viewer is identified by either the image recognition system or the RFID detection system, the algorithm would utilize logic to determine the final demographic classification to be communicated to the delivery control system. As noted above, this determination would be governed by pre-defined rules stored in a demographics assignments rules database accessible to the algorithm. In this regard, if the algorithm receives information that three viewers are detected, and that all are women, but of various ages and ethnicities, then the algorithm may determine that the appropriate final demographic classification to be communicated to the delivery control system should be simply "female" with no stipulated classifications for the age or ethnicity demographic areas. Alternatively, if the algorithm receives information that small children are present along with various adults, the rules consulted by the algorithm may nonetheless dictate that only content suitable for the demographic classification "any gender, any ethnicity, ages 10 and under" be delivered irrespective of the demographic classifications of any other viewers. Likewise, the rules may require the algorithm to give preference to certain demographic classifications for advertising purposes. For example, a consumer electronics retailer using the present invention may desire to wish to market more aggressively to males (or those classified by purchasing history as having traditionally "male" interests demographically) as they have made a strategic determination that those customers constitute the largest spenders on consumer electronics. In such situations, rules can be defined in the database such that the demographic classification algorithm will send a final demographic classification to the delivery control system including the "male" classification, for example, whenever at least one male is identified from a group of current viewers or, for example, if a female gender classification made in a single viewer situation does not conclusively determine that the viewer is female (e.g., a low confidence score is reported by the image recognition system).

If both types of classification technologies are being used simultaneously, rules will be defined that enable the demographic classification algorithm to prioritize the information it receives from the image recognition and RFID detection systems. For example, viewer identification data from the RFID detection system may be defined as being of higher priority than viewer identification data from the image recognition system, causing the algorithm to consider only data from the RFID detection system whenever a customer loyalty card is detected. In this manner, a retailer employing such a system according to the present invention can make certain that additional focus is placed upon making certain to communicate marketing and promotional messages to participating consumers whenever in-store opportunities arise. Upon determining the final demographic classification, the demographic classification system communicates the final classification to the delivery control system, completing step 304.

At step 306, the delivery control system uses the received priority demographic classification to identify appropriate media content (e.g., digital video files) stored in the content database of the delivery control system associated with that particular demographic classification. As discussed further below with respect to FIG. 4, multiple media content files can be associated with any given demographic classification using a look up table, or alternatively through other like means, such as metadata tagged digital media content files. Once the appropriate media content files have been identified, they can be queued up into a playlist for delivery to the viewers in a prioritized order using the output delivery system.

Turning briefly to FIG. 4 for purposes of illustration, there is depicted an example of a generic demographic-to-content file correlation table 400 that may be utilized by a delivery control system to identify stored digital media content files with appropriate demographic classifications. As shown in FIG. 4, there is a first column 401 that identifies various different demographic classifications $D_j$ in its various rows, and four other columns 402-405 that indicate video content files $V_i$ associated with the particular demographic classification in that row. Columns 402-405 are labeled, "1st Video," 2nd Video," etc., respectively, which labeling indicates that video content files identified in column 402 are the primary files associated with the demographic classification in column 401 from their row, files identified in column 403 are the secondary files associated with the corresponding classification in column 403, and so on. Thus, if the delivery control system were to receive an instruction from the demographic classification system to deliver content associated with demographic $D_3$, (e.g., "age 10-20 male"), then the delivery control system would queue up a playlist that included video files, in order, $V_2$, $V_1$, $V_8$, and $V_3$.

Additionally, it should be noted that the last row 406 of table 400 is depicted as being related to demographic classification $D_G$, which indicates a "generic" demographic. Thus, such a DBCD system using table 400 would be configured to queue video files $V_G$, $V_1$, $V_5$, and $V_2$ should no demographic classification be available (or no viewer detected). Furthermore, the DBCD system could be configured to default to the generic classification $D_G$, or to relatively more generic classifications than the one indicated as the priority demographic (e.g., proceed from the "age 10-20 male" demographic classification to the slightly more generic "male" classification, and then to the generic classification), should all video files be exhausted to for a particular demographic. This configuration could be utilized advantageously to limit repetitive playback of the same video files.

It should be appreciated that table 400 is merely illustrative and that any number of columns (and thus any number of ordered content files) and any number of rows (and thus any number of possible demographic classifications) can be utilized to accommodate and adopt the system configuration desired.

Referring again to FIG. 3, at step 307 process 300 concludes with the queued media content files being delivered in the predefined queued sequence to the viewer(s) using the output delivery system. As depicted by the dotted-line arrow in FIG. 3, it should be appreciated by one skilled in the art that steps 304-307 will essentially be occurring repeatedly and in parallel while the architecture continues in operation. For example, the DBCD system could be adapted to repeat a new viewer detection sweep every 2 minutes to determine whether a new priority demographic classification (and thus new video content playlist) is required. If the priority demographic classification is not changed, then the original playlist could continue. If the demographic changes, then the playlist would change and its delivery would be initiated at the next appropriate changeover point (i.e., preferably avoiding the abrupt stopping and restarting of content delivery at inappropriate times during delivery).

Additionally, it should of course be understood that any one of steps 301-303 can be repeated at any time by an administrator in order to update or modify the operation of the DBCD system or its content.

In alternative embodiments of the invention, the RFID detection system utilized may be adapted to coordinate with the central control network at step 304 and instruct the demographic detection system at step 305 to explicitly direct the delivery control system to deliver at step 307 one or more particular content files instead of providing indications concerning actual or inferred demographic classifications. In this manner, the central control system could override any demographic classification algorithm rules at appropriate times in order to provide individually targeted content to specific consumers identified by their respective RFID tagged customer loyalty cards.

In this manner, the promotional messages crafted by the retailer reaches a demographically targeted audience at the point-of-sale, providing the ability to perform more valuable marketing to a broad audience of active product purchasers.

It will be readily appreciated by one skilled in the art that various processes of the methods described herein may be implemented using software stored in the memory for execution by suitable processors. Alternatively, the computing devices may implement such processes and methods in hardware or a combination of software and hardware, including any number of processors independently executing various programs and dedicated hardware, such as application specific integrated circuits (ASICs), field programmable gate arrays (FPGAs), and the like.

Having described preferred embodiments of the invention, it will now become apparent to those of ordinary skill in the art that other embodiments incorporating these concepts may be used with the incorporation of insubstantial variations. Accordingly, it is submitted that that the invention should not be limited to the described embodiments but rather should be limited only by the spirit and scope of the appended claims.

Thus, although the invention has been described and illustrated with a certain degree of particularity, it is understood that the present disclosure has been made only by way of example, and that numerous changes in the combination and arrangement of steps or orientation of parts can be resorted to by those skilled in the art without departing from the spirit and scope of the invention, as will be claimed.

The invention claimed is:

1. An electronic system for selectively delivering multimedia content to persons based upon automatically detected demographic data relating to one or more of said persons, said electronic system comprising:
   an output delivery unit for delivering multimedia content to said persons;
   a delivery control unit adapted to send control signals to said output delivery unit to vary multimedia content delivered, said delivery control unit including a database containing digital content files and an application for selecting and delivering said digital content files to said output delivery unit via said control signals; and a demographic classification unit for detecting said persons and assigning demographic classifications thereto, said demographic classifications being assigned by a demographic classification algorithm according to predefined classification rules; and wherein said demographic classification unit
includes an electronic image recognition system utilizing a computerized recognition algorithm to analyze captured photographs of said persons and a radio frequency identification (RFID) detection system adapted to identify RFID-tagged customer loyalty cards associated with particular persons when ones of said cards enter a viewing area, sends demographic signals to said delivery control unit representing said assigned demographic classifications, and said application selects certain appropriate content files based upon said received demographic signals and stored data correlating said content files to predefined demographic classifications, looks up information concerning said ones of said cards in a customer information database, compares identification information received from said image recognition system and said RFID detection system according to said computerized recognition algorithm, determines and outputs a measure of certainty for each of the demographic classifications based on said computerized recognition algorithm, and disregards demographic classifications that have a measure of certainty below a predetermined value.

2. The system according to claim 1, wherein said demographic classification system utilizes one or more digital video cameras to capture facial images of said persons.

3. The system according to claim 2, wherein said facial images are compared by said demographic classification system to a database of demographically categorized photographs to determine probable demographic classifications for one or more of said persons.

4. The system according to claim 1, wherein said RFID detection system communicates with a central control system to retrieve demographic information specific to viewers identified by detected RFID-tagged customer loyalty cards.

5. The system according to claim 4, wherein said retrieved demographic information specific to viewers identified by said detected RFID-tagged customer loyalty cards comprise one of actual demographic classifications or inferred demographic classifications.

6. The system according to claim 1, further comprising a remotely located central control system electronically connected to said demographic based content delivery system, and wherein said central control system is configured to be able to send a signal to said demographic based content delivery system that causes said delivery control unit to select content files for display to individually identified persons.

7. The system according to claim 1, further comprising a remotely located central control system electronically connected to said demographic based content delivery system, and wherein said central control system is configured to be able to update said content files in said database of said delivery control unit.

8. The system according to claim 1, further comprising a remotely located central control system electronically connected to said demographic based content delivery system, and wherein said central control system is configured to be able to update said stored data correlating said content files to said predefined demographic classifications.

9. The system according to claim 1, further comprising a remotely located central control system electronically connected to said demographic based content delivery system, and wherein said central control system is configured to be able to update said classification rules used by said algorithm.

10. The system according to claim 1, wherein said computerized recognition algorithm uses said predefined classification rules to balance said identification information.

11. The system according to claim 10, wherein said predefined classification rules stipulate that certain of said ones of said cards override identification information received from said image recognition system.

12. A computer-implemented demographic based content delivery method for selectively delivering multimedia content to persons based upon automatically detected demographic data relating to one or more of said persons, the computer including a processor and memory and the method comprising steps performed by the computer of:

storing, by the processor, digital multimedia content files in an electronic database;

associating, by the processor, one or more demographic assignments with each of said content files;

defining, by the processor, demographic classification rules for usage by a computer operated demographic classification algorithm, said rules controlling prioritization determinations made by said algorithm upon inputted demographic data;

detecting, by the processor, viewer identification data electronically and automatically concerning one or more of said persons within a defined viewing area;

determining, by the processor, with said demographic classification algorithm a priority demographic classification for said persons within said defined viewing area according to said rules and said detected viewer identification data;

identifying, by the processor, one or more content files associated with said priority demographic classification; and delivering, by the processor, said identified one or more content files, wherein said detecting comprises:
utilizing a computerized recognition algorithm to analyze captured photographs of said persons,
utilizing a radio frequency identification (RFID) detection system adapted to identify RFID-tagged customer loyalty cards associated with particular persons when ones of said cards enter a viewing area,
looking up information concerning said ones of said cards in a customer information database,
comparing identification information received from said image recognition system and said RFID detection system according to said computerized recognition algorithm,
determining and outputting a measure of certainty for each of the demographic classifications based on said computerized recognition algorithm, and
disregarding demographic classifications that have a measure of certainty below a predetermined value.

13. The method according to claim 12, wherein said electronic image recognition system utilizes one or more digital video cameras to capture facial images of said persons.

14. The method according to claim 13, wherein said facial images are compared by said recognition algorithm to a database of demographically categorized photographs to determine probable demographic classifications for one or more of said persons.

15. The method according to claim 12, wherein said RFID detection system communicates with a central control system to retrieve demographic information specific to viewers identified by detected RFID-tagged customer loyalty cards.

16. The method according to claim 15, wherein said retrieved demographic information specific to viewers identified by said detected RFID-tagged
   determining and outputting a measure of certainty for each of the demographic classifications based on said computerized recognition algorithm, and
   disregarding demographic classifications that have a measure of certainty below a predetermined value. customer loyalty cards comprise one of actual demographic classifications or inferred demographic classifications.

17. The method according to claim 12, further comprising sending, by the processor, an electronic signal from a remote location to cause selection of content files for display to individually identified persons.

18. The method according to claim 12, further comprising sending, by the processor, an electronic update signal from a remote location to update said content files in said electronic database.

19. The method according to claim 12, further comprising sending, by the processor, an electronic update signal from a remote location to change said demographic assignments.

20. The method according to claim 12, further comprising sending, by the processor, an electronic update signal from a remote location to update said classification rules used by said computer operated demographic classification algorithm.

21. The method according to claim 12, wherein said computerized recognition algorithm uses said demographic classification rules to balance said identification information.

22. The method according to claim 21, wherein said demographic classification rules stipulate that certain of said ones of said cards override identification information received from said image recognition system.

23. A content delivery process for selectively delivering multimedia content to persons using an automated demographic detecting content delivery system, said process comprising:
   establishing a demographic based content delivery system having output delivery unit for delivering multimedia content to said persons, a delivery control unit adapted to send control signals to said output delivery unit to vary multimedia content delivered, and a demographic classification unit for detecting said persons and assigning demographic classifications thereto;
   storing digital multimedia content files in an electronic database of said delivery control unit;
   associating in said delivery control unit one or more demographic assignments with each of said content files;
   defining demographic classification rules for usage by a computer operated demographic classification algorithm of said demographic classification unit, said rules controlling prioritization determinations made by said algorithm upon detected identification data;
   said demographic classification unit detecting viewer identification data electronically and automatically concerning one or more of said persons within a defined viewing area;
   determining with said algorithm a priority demographic classification for said persons within said defined viewing area according to said rules and said detected viewer identification data;
   said delivery control unit receiving said priority demographic classification and identifying one or more content files associated with said priority demographic classification; and
   controlling said output unit to deliver said identified one or more content files wherein said detecting comprises:
      utilizing a computerized recognition algorithm to analyze captured photographs of said persons,
      utilizing a radio frequency identification (RFID) detection system adapted to identify RFID-tagged customer loyalty cards associated with particular persons when ones of said cards enter a viewing area,
      looking up information concerning said ones of said cards in a customer information database,
      comparing identification information received from a image recognition system and said RFID detection, system according to said computerized recognition algorithm,

* * * * *

UNITED STATES PATENT AND TRADEMARK OFFICE
CERTIFICATE OF CORRECTION

PATENT NO.         : 8,489,459 B2                                   Page 1 of 1
APPLICATION NO.    : 11/513408
DATED              : July 16, 2013
INVENTOR(S)        : William E. Vallier et al.

It is certified that error appears in the above-identified patent and that said Letters Patent is hereby corrected as shown below:

Title page, item [57], Abstract, Line 7, "on combination" should read --in combination--.

In the Claims

Claim 16, col. 19, lines 6-10, remove "determining and outputting a measure of certainty for each of the demographic classifications based on said computerized recognition algorithm, and disregarding demographic classifications that have a measure of certainty below a predetermined value.".

Signed and Sealed this
Seventh Day of January, 2014

Margaret A. Focarino
*Commissioner for Patents of the United States Patent and Trademark Office*